(12) United States Patent
Zhang

(10) Patent No.: US 7,834,089 B2
(45) Date of Patent: Nov. 16, 2010

(54) IONOMERIC ETHYLENE VINYL ALCOHOL COMPOSITIONS

(75) Inventor: David D. Zhang, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 371 days.

(21) Appl. No.: 11/800,953

(22) Filed: May 8, 2007

(65) Prior Publication Data

US 2008/0281045 A1 Nov. 13, 2008

(51) Int. Cl.
| | |
|---|---|
| C08L 29/04 | (2006.01) |
| C08L 23/08 | (2006.01) |
| C08L 35/00 | (2006.01) |
| C08L 35/02 | (2006.01) |
| C08J 5/18 | (2006.01) |
| B32B 27/30 | (2006.01) |
| B65D 85/00 | (2006.01) |

(52) U.S. Cl. .................. 525/57; 525/60; 525/201; 525/221; 525/240

(58) Field of Classification Search .............. 525/57, 525/60, 201, 221, 240
See application file for complete search history.

(56) References Cited

U.S. PATENT DOCUMENTS

| | | | |
|---|---|---|---|
| 3,262,272 A | 7/1966 | Barakauskas | |
| 3,264,272 A * | 8/1966 | Rees | 428/36.9 |
| 5,700,890 A | 12/1997 | Chou | |
| 5,859,137 A | 1/1999 | Chou | |
| 6,214,392 B1 | 4/2001 | Ramirez | |
| 6,333,061 B1 | 12/2001 | Vadhar | |
| 2005/0020762 A1 | 1/2005 | Chou | |
| 2005/0203253 A1 | 9/2005 | Chou | |
| 2006/0142489 A1 | 6/2006 | Chou | |
| 2006/0228503 A1 | 10/2006 | Havens | |

FOREIGN PATENT DOCUMENTS

| | | | |
|---|---|---|---|
| EP | 0238870 A2 | | 9/1987 |
| EP | 1816159 A1 | | 8/2007 |
| JP | 09328592 A | * | 12/1997 |
| JP | 2000248124 A | * | 9/2000 |
| JP | 2000344989 A | * | 12/2000 |
| JP | 2001279039 A | * | 10/2001 |
| WO | 2006053297 A1 | | 5/2006 |
| WO | 2006057351 A1 | | 6/2006 |
| WO | WO 2006057351 A1 | * | 6/2006 |

OTHER PUBLICATIONS

Translation to JP 2000-248124 to Tateno et al. (Sep. 2000).*

* cited by examiner

Primary Examiner—Kelechi C Egwim

(57) ABSTRACT

Disclosed are compositions of ethylene acid copolymers and EVOH that are useful for fabricating films, sheets and other shaped articles such as tubing, bottle, fuel tank, tray etc. comprising (1) an ethylene vinyl alcohol copolymer; and (2) a copolymer comprising in-chain copolymerized units of (a) in-chain copolymerized units of ethylene; (b) in-chain polymerized units of an $\alpha,\beta$-unsaturated $C_3$-$C_8$ carboxylic acid; (c) in-chain polymerized units of at least one comonomer that is an ethylenically unsaturated dicarboxylic acid or derivative thereof; and optionally (d) in-chain copolymerized units of alkyl acrylate or alkyl methacrylate, and wherein the carboxylic acid functionalities present are at least partially neutralized by one or more alkali metal, transition metal, or alkaline earth metal cations. The compositions can be used for packaging of foodstuffs, medical solutions and industrial chemicals.

19 Claims, No Drawings

IONOMERIC ETHYLENE VINYL ALCOHOL COMPOSITIONS

This invention relates to compositions comprising ethylene vinyl alcohol copolymers and anhydride ionomers that are useful for fabricating films, sheets and other shaped articles.

BACKGROUND OF THE INVENTION

Ethylene vinyl alcohol (EVOH) copolymers are used widely for packaging food, medical solutions and other products. Often the function of EVOH is to provide a barrier to passage of gases such as oxygen through the packaging. There is a need in industry to improve the toughness of films containing EVOH, especially at lower temperature. For example, EVOH-based multilayer films are used in packaging meat, which is often stored and transported at freezer temperatures.

There are approaches in toughening EVOH with different polymeric modifiers with varied results. Adding typical modifiers that could bring about a desirable toughness and stiffness tend to reduce the optical clarity and can turn EVOH into an opaque film. Blends of EVOH and modifiers typically consist of microscopic particles of one polymer dispersed in a continuous phase of the other polymer. Poorly dispersed and/or large particles tend to scatter rather than transmit light. As a result the polymer blends tend to be opaque. For many food packaging and health care applications, the see-through clarity and/or contact clarity of a film or structure, either monolayer or multilayer, may be important. These applications demand new materials with good processability, mechanical properties, impact toughness, or optical properties, or be available at an affordable cost for broad applications. Ionomeric resins (ionomers) are thermoplastic resins that contain metal ions in addition to organic-chain molecules. Ionomers have solid-state properties characteristic of cross-linked polymers and melt-fabricability properties characteristic of uncrosslinked thermoplastic polymers (see, e.g., U.S. Pat. No. 3,264,272). Ionomers may be prepared from copolymers of an olefin such as ethylene with an unsaturated carboxylic acid, such as acrylic acid, methacrylic acid, and/or other acids, and optionally softening comonomers such as alkyl acrylates or alkyl methacrylates. At least one alkali metal, transition metal, or alkaline earth metal cation, such as lithium, sodium, potassium, magnesium, calcium, or zinc, or a combination of such cations, is used to neutralize some portion of the acidic groups in the copolymer. Owing to their water-like clarity and high toughness, ionomers such as those available from E. I. du Pont de Nemours and Company (DuPont) under the trademark SURLYN have been disclosed for use in packaging.

Ionomers have been used to modify EVOH. For example, U.S. Pat. Nos. 6,214,392 and 6,333,061 and US Patent Application 2006/0228503 disclose EVOH modified with polyamide-containing ionomers (N-ionomers).

Recently a new family of ionomers has been disclosed in U.S. Pat. No. 5,700,890, wherein neutralized ethylene acid copolymers are prepared using dicarboxylic acids, or derivatives thereof, as monomers in addition to the monocarboxylic acids used in typical ionomers. These "anhydride ionomer" copolymers may further contain an alkyl acrylate comonomer.

US Patent Applications 2005/0203253, 2005/020762 and 2006/0142489 disclose compositions wherein polyamides are toughened with anhydride ionomers.

As disclosed in this application, films made from anhydride ionomer-modified EVOH show excellent impact resistance (more than 100% better than unmodified EVOH) and unlike EVOH modified with N-ionomers, almost no change in oxygen barrier. Film optical properties such as haze and transparency also show almost no change compared to an unmodified sample. Anhydride ionomer-modified EVOH bonded to PE with an adhesive tie resin has similar adhesion to that exhibited by N-ionomer-modified EVOH. Films and other shaped articles comprising anhydride ionomer-modified EVOH can be used in both food and non-food packaging where high barrier, toughness and clarity are desired.

SUMMARY OF THE INVENTION

This invention provides a composition comprising or produced from:

(1) an ethylene vinyl alcohol copolymer; and (2) an ionomer comprising a copolymer having (a) in-chain copolymerized units of ethylene; (b) in-chain copolymerized units of an $\alpha,\beta$-unsaturated $C_3$-$C_8$ carboxylic acid; (c) in-chain copolymerized units of at least one comonomer; and optionally (d) in-chain copolymerized units of alkyl acrylate or alkyl methacrylate, and wherein the combined carboxylic acid functionalities present are at least partially neutralized by one or more alkali metal, transition metal, or alkaline earth metal cation.

The composition may be processed by e.g. extruding or casting a sheet or blowing a film, injection molding, blow molding, or profile extrusion to provide a shaped article. Accordingly, the present invention also provides articles comprising the composition as described above. The article may be in the form of a monolayer or multilayer film or sheet, pouch or bag, bottle, tray, tank, or tubing. This invention also provides a package comprising the compositions described above for containing a product.

DETAILED DESCRIPTION OF THE INVENTION

All references disclosed herein are incorporated by reference.

Unless stated otherwise, all percentages, parts and ratios, are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range having a lower limit of 0, such component is an optional component (i.e., it may or may not be present). Such optional components, when present, are included in a finite amount preferably of at least about 0.1 weight % of the total weight of the composition. The term "finite amount" refers to an amount that is greater than zero.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

As used herein, the term "copolymer" refers to polymers comprising copolymerized units resulting from copolymerization of two or more comonomers and may be described with reference to its constituent comonomers or to the amounts of its constituent comonomers such as, for example "a copolymer comprising ethylene and 15 weight % of acrylic acid". Such a description may be considered informal in that it does not refer to the comonomers as copolymerized units; in that it does not include a conventional nomenclature for the copolymer, for example. International Union of Pure and Applied Chemistry (IUPAC) nomenclature; in that it does not use product-by-process terminology; or for another reason. However, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

Thermoplastic resins are polymeric materials that can flow when heated under pressure. Melt index (MI) is the mass rate of flow of a polymer through a specified capillary under controlled conditions of temperature and pressure. It is measured according to ASTM 1238.

(Meth)acrylic acid refers to acrylic acid, methacrylic acid, or both. (Meth)acrylate refers to acrylate, methacrylate, or both.

"Sheets" and "films" may be used interchangeably to describe articles wherein the compositions are processed into generally planar forms, either monolayer or multilayer. The processing method and/or the thickness may influence whether the term "sheet" or "film" is used herein, but either term can be used to describe such generally planar articles.

Ethylene vinyl alcohol copolymers are commonly known as EVOH. Such polymers generally have an ethylene content of between about 15 mole percent to about 60 mole percent, more preferably between about 24 to about 44 mole percent. EVOH generally has a density ranging from between about 1.12 g/cm$^3$ to about 1.20 g/cm$^3$ and a melting temperature ranging from between about 142° C. and 196° C. EVOH polymers can be prepared by known preparative techniques or can be obtained from commercial sources. They can be prepared by saponifying or hydrolyzing ethylene vinyl acetate copolymers. Thus EVOH may also be known as hydrolyzed ethylene vinyl acetate copolymer. The degree of hydrolysis can be about 50 to 100 mole % or about 85 to 100 mole %. In addition, the weight average molecular weight, $M_w$, of the EVOH component, calculated from the degree of polymerization and the molecular weight of the repeating unit, may be in a range of about 5,000 $M_w$ to about 300,000 $M_w$, or about 50,000 $M_w$ to about 70,000 M. Suitable EVOH polymers for use as components of the composition disclosed herein may be obtained from EVAL Company of America (EVAL® resins) such as EVAL® SP, Evalca or Kuraray Ltd., or from Noltex L.L.C or Nippon Gohsei (SOARNOL®).

Anhydride ionomers include a family of ionomers containing in-chain copolymerized units of ethylene, an α,β-unsaturated $C_3$-$C_8$ monocarboxylic acid and at least one ethylenically unsaturated dicarboxylic acid comonomer selected from $C_4$-$C_8$ unsaturated acids having at least two carboxylic acid groups, cyclic anhydrides of $C_4$-$C_8$ unsaturated acids having at least two carboxylic acid groups, and monoesters (wherein one carboxyl group of the dicarboxylic moiety is esterified and the other is a carboxylic acid) of $C_4$-$C_8$ unsaturated acids having at least two carboxylic acid groups; at least partially neutralized by an alkali metal, transition metal, or alkaline earth metal cation, such as lithium, sodium, potassium, magnesium, calcium, or zinc, or a combination of such cations. The anhydride ionomers contain the ethylenically unsaturated dicarboxylic acid comonomer in an amount of from about 0.5 to about 12 weight %, or about 3 weight % to about 25 weight %, or about 4 weight % to about 10 weight % of the copolymer. The unsaturated dicarboxylic acid comonomers include, for example, maleic acid, fumaric acid, itaconic acid, and $C_1$-$C_4$ alkyl monoesters of maleic acid, such as ethyl hydrogen maleate, or combinations of two or more thereof.

The copolymers can also optionally include other comonomers such as alkyl(meth)acrylates providing softer resins that can be neutralized to form softer ionomers wherein the alkyl groups have from 1 to 8 carbon atoms such as methyl acrylate, ethyl acrylate and n-butyl acrylate (nBA). The alkyl(meth) acrylates, when present, can be from 0 to about 30 weight % based on the total weight of the copolymer, or about 0.1 to about 15 weight %. These copolymers can be at least partially neutralized by one or more alkali metal, transition metal, or alkaline earth metal cations.

The acid copolymers used to make the anhydride ionomers can be obtained by high-pressure free radical polymerization. The acid comonomers are directly copolymerized with ethylene by adding all monomers simultaneously. This process provides copolymers with "in-chain" polymerized units derived from the monomers, where the units are incorporated into the polymer backbone or chain. These copolymers are distinct from a graft copolymer, in which the acid comonomers are added to an existing polymer chain via a post-polymerization grafting reaction, where another monomer is grafted onto an existing polymer, often by a subsequent free radical reaction. Some non-neutralized ethylene acid copolymers comprising ethylenically unsaturated dicarboxylic acid comonomers are known (e.g., U.S. Pat. No. 5,902,869) as are their ionomeric derivatives (e.g., U.S. Pat. No. 5,700,890).

Examples of copolymers include copolymers of ethylene, methacrylic acid and ethyl hydrogen maleate (E/MAA/EHM), copolymers of ethylene, acrylic acid and maleic anhydride (E/AA/MAH), copolymers of ethylene, methacrylic acid, ethyl hydrogen maleate and ethyl acrylate (E/MAA/EHM/EA), copolymers of ethylene, acrylic acid, maleic anhydride and methyl acrylate (E/AA/MAH/MA), or combinations of two or more thereof.

Neutralization of an ethylene acid copolymer can be effected by first making the ethylene acid copolymer and treating the copolymer with alkali metal, alkaline earth metal or transition metal cation(s). The copolymer can be from about 10 to about 99.5% neutralized with at least one metal ion selected from lithium, sodium, potassium, magnesium, calcium, barium, lead, tin, zinc, aluminum; or combinations of such cations. For example, neutralization may be from about 10 to about 70 or about 35 to about 70% of the available carboxylic acid groups ionized by neutralization with at least one metal ion selected from sodium, zinc, lithium, magnesium, and calcium; and more preferably sodium, zinc or magnesium. Examples include anhydride ionomers comprising sodium or zinc as a neutralizing cation. Methods for preparing anhydride ionomers from the copolymers are known in the art (e.g., U.S. Pat. No. 5,700,890).

An exemplary composition comprises or produced from %, based on the total weight of the composition, (1) about 60 to about 95 weight of an ethylene vinyl alcohol copolymer and (2) from about 5 to about 40 weight % of an ionomer wherein the ionomer can comprise a copolymer comprising (a) in-chain copolymerized units of ethylene; (b) from about 5 weight % to about 15 weight % of in-chain copolymerized units of an α,β-unsaturated $C_3$-$C_8$ carboxylic acid; (c) from about 0.5 weight % to about 18 weight % of in-chain copolymerized units of at least one comonomer including or selected from $C_4$-$C_8$ unsaturated acids having at least two carboxylic acid groups, cyclic anhydrides of $C_4$-$C_8$ unsaturated acids having at least two carboxylic acid groups, monoesters of $C_4$-$C_8$ unsaturated acids having at least two carboxylic acid groups, or combinations of two or more thereof; and (d) from 0 to about 40 weight % of in-chain copolymerized units of alkyl acrylate or alkyl methacrylate, wherein the alkyl groups have from one to twelve carbon atoms wherein the amounts of (a), (b), (c) and (d) are based on the weight of the copolymer and wherein the combined carboxylic acid functionalities present are at least partially neutralized by one or more alkali metal, transition metal, or alkaline earth metal cations.

Alternatively, the composition may comprise from about 65 to about 95 weight % of the ethylene vinyl alcohol copolymer and from about 5 to about 35 weight % of the ionomeric composition.

Component (2)(c) may be present in a range from about 4 to about 16 weight % of the copolymer, or from about 5 to about 10 weight % of the copolymer. Component (2)(c) may comprise copolymerized units of a $C_1$-$C_4$ alkyl monoester of maleic acid, present in a range from about 6 to about 10, or from about 6 to about 8, weight % of the copolymer. For example, component (2) may be a copolymer of ethylene, methacrylic acid and $C_1$-$C_4$ alkyl monoester of maleic acid, wherein said copolymer is from about 40 to about 60% neutralized, particularly wherein the $C_1$-$C_4$ alkyl monoester of maleic acid is present in the copolymer in a range from about 6 to about 10, or from about 6 to about 8, weight %.

The compositions can optionally comprise additional thermoplastic materials blended with EVOH component (1) and anhydride ionomer component (2). Blending additional components may allow one to more easily modify the properties of an EVOH-containing composition by manipulating the amount and type of additional components present in the composition in addition to varying the percentages of the monomers in the ethylene acid copolymer and/or the neutralization level. Furthermore, blending additional thermoplastic materials can allow for easier, lower cost manufacture of polymer compositions by allowing one to prepare fewer base resins that can be subsequently modified to obtain desired properties. Examples of other thermoplastic materials that can be used include nonionomeric thermoplastic copolymers and ionomeric thermoplastic copolymers. The additional nonionic thermoplastic polymer components can be selected from among polyamides, copolyetheresters, copolyetheramides, elastomeric polyolefins, styrene diene block copolymers, thermoplastic polyurethanes, maleic anhydride-grafted polymers, etc., these classes of polymers being well known in the art (see below).

Example also includes blends of component (1) and component (2) further comprising conventional ionomers (ionomers that do not comprise a dicarboxylic acid comonomer). Accordingly, compositions include blends of component (1) and component (2), as previously defined, further comprising (3) one or more E/X/Y copolymers where E represents copolymerized units of ethylene, X represents copolymerized units of a $C_3$-$C_8$ α,β-ethylenically unsaturated monocarboxylic acid, and Y represents copolymerized units of a comonomer selected from alkyl acrylate and alkyl methacrylate wherein the alkyl groups have from 1 to 8 carbon atoms, wherein X is present in from about 2 to about 30 weight % of the E/X/Y copolymer, and Y is present from 0 to about 40 weight % of the E/X/Y copolymer, at least partially neutralized by one or more alkali metal, transition metal, or alkaline earth metal cations. Of note are ionomers prepared from dipolymers consisting essentially of copolymerized units of ethylene and copolymerized units of acrylic acid or methacrylic acid (E/X dipolymers or E/X/Y copolymers where Y is 0.) Also of note are ionomers prepared from terpolymers consisting essentially of copolymerized units of ethylene, copolymerized units of acrylic acid or methacrylic acid and copolymerized units of alkyl acrylate or alkyl methacrylate where Y is present from about 0.1 to about 40 weight % of the E/X/Y copolymer.

Non-limiting, illustrative examples of conventional ionomers include E/15MAA/Na, E/19MAA/Na, E/15AA/Na, E/1 gAA/Na, E/15MAA/Mg and E/1 gMAA/Li (wherein E represents ethylene, MAA represents methacrylic acid, AA represents acrylic acid, the number represents the weight % of monocarboxylic acid present in the copolymer and the atomic symbol represents the neutralizing cation). When such conventional ionomer or combination of conventional ionomers are added to the blend of EVOH and anhydride ionomer (prepared from a copolymer containing the dicarboxylic acid comonomer), the conventional ionomers can be a substitute for up to half (50% by weight) of component (2).

Depending on the need of a particular application, the amount of such conventional ionomer or mixture of conventional ionomers in combination with the anhydride ionomer in component (2) can be manipulated to provide an appropriate balance of clarity, toughness, barrier and impact strength. For example, highly toughened EVOH compositions with improved clarity can be achieved by using relatively larger amounts of conventional ionomers with smaller amounts of anhydride ionomers (for example, 30 weight % of a conventional ionomer and 5 weight % of anhydride ionomer). High-clarity toughened EVOH films can be prepared using relatively larger amounts of anhydride ionomers with smaller amounts of conventional ionomers (for example, 30 weight % of anhydride ionomer and 5 weight % of a conventional ionomer). Of note are modifier blends comprising equal amounts of anhydride ionomer and conventional ionomer (for example, 15 weight % of anhydride ionomer and 15 weight % of conventional ionomer).

Compositions comprising anhydride ionomers and conventional ionomers can be obtained by mixing anhydride ionomers and conventional ionomers and either concurrently or subsequently mixing them with EVOH. That is, the acid copolymers comprising a combination of monocarboxylic acid units and dicarboxylic acid units and the acid copolymers comprising monocarboxylic acid units are neutralized separately and then mixed. Alternatively, the acid copolymers comprising a combination of monocarboxylic acid units and dicarboxylic acid units and the acid copolymers comprising monocarboxylic acid units are mixed and subsequently neutralized.

The composition includes blends further comprising maleic anhydride-grafted polymers (maleated polymers). Maleic anhydride-grafted polymers include maleated polyethylene, maleated polypropylene, maleated polyethylene/polypropylene rubber, maleated styrene-ethylene-butene-styrene triblock copolymer, maleated polybutadiene, maleated ethylene/vinyl acetate and maleated ethylene/alkyl acrylate, or combinations of two or more thereof.

Anhydride-grafted polymers can be obtained by known techniques. For example, a polymer such as polyethylene, an ethylene/vinyl acetate copolymer or an ethylene/alkyl acrylate copolymer may be dissolved in an organic solvent along with an unsaturated dicarboxylic acid anhydride, such as maleic anhydride, and a radical generator, followed by heating with stirring. Alternatively, the grafted polymers may be prepared by a process in which the reactive components and the polymer are fed to an extruder, for example to provide a maleic anhydride-grafted ethylene copolymer. These processes provide copolymers wherein the maleic anhydride comprises moieties that are pendant from the previous polymer backbone.

Additional details on the preparation and use of maleated polyethylenes are described in U.S. Pat. No. 6,545,091. An example of a maleic anhydride-modified linear high-density polyethylene is a product sold as POLYBOND® 3009 by Crompton Corporation. Similar maleated polyolefins are sold as FUSABOND® by DuPont. The maleated polyethylenes can include those with densities less than 0.90 g/cm$^3$, the lower-density maleated polyethylenes are considered to be softer modifiers.

The amount of such maleated polymer(s) in combination with the anhydride ionomer in component (2) can be manipulated to provide an appropriate balance of clarity, toughness and low temperature impact strength. For example, highly toughened EVOH compositions with improved clarity can be achieved by using relatively larger amounts of maleated polymers with smaller amounts of anhydride ionomers (for example, 30 weight % of a maleated polymer and 5 weight % of anhydride ionomer). High-clarity toughened EVOH films can be prepared using relatively larger amounts of anhydride ionomers with smaller amounts of maleated polymers (for example, 30 weight % of anhydride ionomer and 5 weight % of a maleated polymer). Example includes blends comprising equal amounts of anhydride ionomer and maleated polymers (e.g., 15 weight % of anhydride ionomer and 15 weight % of a maleated polymer).

The composition can additionally comprise optional additives including plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, and/or combinations of two or more thereof. The additive may be present in about 0.001 up to about 20 weight % of the polymer composition. Such amounts may also be those that do not detract from the basic and novel characteristics of the polymer compositions.

The compositions can be formed into shaped articles by various means known to those skilled in the art. For example, the compositions can be extruded, injection molded, compression molded, blow molded, overmolded, laminated, cut, milled or the like to provide an article that is in a desired shape and size. Optionally, articles may be further processed. For example, portions of the composition (such as, but not limited to, pellets, slugs, rods, ropes, sheets and molded or extruded articles) may be subjected to thermoforming operations in which the composition is subjected to heat, pressure and/or other mechanical forces to produce shaped articles.

Articles comprising the anhydride ionomer-EVOH blends may further comprise other components. For example, the anhydride ionomer-EVOH compositions may be included as one or more layers of a multilayer polymeric structure in which additional layers of thermoplastic resins may be included to provide functional layers to provide additional functionality to the article. Example includes multilayer structures comprising ionomeric materials in at least one additional layer. The layer(s) of the anhydride ionomer modified EVOH composition and other polymeric layers may be formed independently and then adhesively attached to one another to form an article. The article may also be fabricated by extrusion coating or laminating some or all of the layers onto a substrate. Some of the components of an article may be formed together by coextrusion, particularly if the components are relatively coplanar. Thus, an article may be a film or sheet comprising a layer of the anhydride ionomer-EVOH composition and one or more additional layers of different thermoplastic material(s) in a multilayer coextruded film or sheet.

Examples of other thermoplastic materials that can be used to form a component of an article in addition to a component formed from the anhydride ionomer modified EVOH compositions in multicomponent or multilayer structures (e.g. films or sheets) can include nonionomeric thermoplastic copolymers and/or ionomeric thermoplastic copolymers.

Nonionic thermoplastic resins include, but not limited to, one or more thermoplastic elastomers, such as polyurethane, poly-ether-ester, poly-amide-ether, polyether-urea, PEBAX® (a family of block copolymers based on polyether-block-amide, commercially supplied by Atochem), styrene-butadiene-styrene (SBS) block copolymers, styrene(ethylene-butylene)-styrene block copolymers (SEBS), etc., styrene isoprene styrene copolymer (SIS), polyamide (oligomeric and polymeric), polyamides, polyesters, polyolefins, including polyethylene, polypropylene, ethylene/propylene copolymers, etc., ethylene copolymers with various comonomers, such as vinyl acetate, (meth)acrylates, (meth)acrylic acid, epoxy-functionalized monomer, CO, etc., functionalized polymers with maleic anhydride, epoxidization etc., either by copolymerization or by grafting, elastomers such as EPDM (ethylene propylene diene monomer rubber), and metallocene catalyzed PE and copolymers.

The additional thermoplastic polymer components can be selected from the group consisting of copolyetheresters, copolyetheramides, elastomeric polyolefins, styrene diene block copolymers, and thermoplastic polyurethanes, all of which are well known in the art.

Polyamides (nylons) are well known to those skilled in the art and can be prepared from lactams or amino acids (e.g., nylon 6 or nylon 11), or prepared from condensation of diamines such as hexamethylene diamine with dibasic acids such as succinic, adipic, or sebacic acid. Copolymers and terpolymers of these polyamides are also included. Examples include polyepsiloncaprolactam (nylon 6); polyhexamethylene adipamide (nylon 6,6); nylon 11; nylon 12, nylon 12,12 and copolymers and terpolymers such as nylon 6/6,6; nylon 6,10; nylon 6,12; nylon 6,6/12; nylon 6/6,10, nylon 6/6T, or combinations of two or more thereof. Other polyamides include amorphous polyamides.

Copolyetheresters are discussed in detail in U.S. Pat. Nos. 3,651,014, 3,766,146, and 3,763,109. Example includes copolyetheresters where the polyether segment is obtained by polymerization of tetrahydrofuran and the polyester segment is obtained by polymerization of tetramethylene glycol and phthalic acid. The more polyether units that are incorporated into the copolyetherester, the softer the polymer.

The copolyetheramides are also well known in the art as disclosed in U.S. Pat. No. 4,331,786, for example. They comprise a linear and regular chain of rigid polyamide segments and flexible polyether segments.

The elastomeric polyolefins are polymers comprising ethylene and higher primary olefins such as propylene, hexene, octene and optionally 1,4-hexadiene and or ethylidene norbornene or norbornadiene. The elastomeric polyolefins can be functionalized with maleic anhydride.

Thermoplastic polyurethanes are linear or slightly chain-branched polymers consisting of hard blocks and soft elastomeric blocks. They are produced by reacting soft hydroxy-terminated elastomeric polyethers or polyesters with diisocyanates such as methylene diisocyanate (MDI) or toluene diisocyanate (TDI). These polymers can be chain extended with glycols, diamines, diacids, or aminoalcohols. The reaction products of the isocyanates and the alcohols are called urethanes and these blocks are relatively hard and high-melting. These hard, high-melting blocks are responsible for the thermoplastic nature of the polyurethanes.

Block styrene diene copolymers comprising polystyrene units and polydiene units. The polydiene units are derived from polybutadiene, polyisoprene units or copolymers of these two. In the case of the copolymer it is possible to hydrogenate the polyolefin to give saturated rubbery backbone segments. These materials are usually referred to as SBS, SIS, or SEBS thermoplastic elastomers and they can also be functionalized with maleic anhydride.

Conventional ionomers are described above.

The anhydride ionomer modified EVOH compositions can also be combined with other substrates including metal foils, nonwovens, glass fibers, carbon fibers, textiles and the like.

The anhydride ionomer modified EVOH compositions can be formed into shaped articles by various means known to those skilled in the art. For example, the compositions can be extruded, injection molded, compression molded, blow molded, overmolded, laminated, cut, milled or the like to provide an article that is in a desired shape and size. Optionally, articles comprising the composition may be further processed, for example, portions of the composition (such as, but not limited to, pellets, slugs, rods, ropes, sheets and molded or extruded articles) may be subjected to thermoforming operations in which the composition is subjected to heat, pressure and/or other mechanical forces to produce shaped articles.

The anhydride ionomer-modified EVOH composition can be (co)extruded and formed into a film by various film-forming means. Films include blown films, cast films, laminated films, or extrusion coated films and can be monolayer or multilayer. Molten extruded polymers can be converted into a film using a suitable converting technique. For example, a multilayer film can be prepared by coextrusion as follows: granulates of the compositions used in the various layers are melted in extruders. The molten polymers are passed through a die or set of dies to form layers of molten polymers that are processed as a layered flow. The molten polymers are cooled to form a multilayer structure. A film can also be made by coextrusion followed by lamination onto one or more other layers. Other suitable converting techniques are, for example, blown film extrusion, cast film extrusion, cast sheet extrusion and extrusion coating.

A film can be further oriented beyond the immediate quenching or casting of the film. The film may be uniaxially oriented, or it can be biaxially oriented by drawing in two mutually perpendicular directions in the plane of the film to achieve a satisfactory combination of mechanical and physical properties. The film optionally may be annealed after orientation.

Orientation and stretching apparatus to uniaxially or biaxially stretch film are known in the art and may be adapted by those skilled in the art to produce films as described herein. Examples of such apparatus and processes include, for example, those disclosed in U.S. Pat. Nos. 3,278,663, 3,337,665, 3,456,044, 4,590,106, 4,760,116, 4,769,421, 4,797,235, and 4,886,634.

A film can be oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which may induce longitudinal orientation.

The double bubble technique can be carried out as disclosed in U.S. Pat. No. 3,456,044. A primary tube is melt extruded from an annular die. This extruded primary tube is cooled quickly to minimize crystallization and then collapsed. It is then heated to its orientation temperature (for example, by means of a water bath). In the orientation zone of the film fabrication machine a secondary tube is formed by inflation, whereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and optionally passed through an annealing step (thermofixation), during which step it is heated once more to adjust the shrink properties. In some applications, it may be desirable to maintain the film in a tubular form. For preparing flat films the tubular film can be slit along its length and opened up into flat sheets that can be rolled and/or further processed.

The film (or sheet) can be used in packaging. The multilayer film may involve at least three categorical layers an outermost structural or abuse layer, an inner barrier layer, and an innermost layer and optionally one or more adhesive or tie layers therebetween. Also, the innermost layer making contact with and compatible with the intended contents of the package (e.g. a pouch) can form lock-up perimeter seals (i.e., seal strengths typically greater than 1,500 gram/inch) for containing the contents of the package. The innermost layer can be also heat-sealable. Outermost refers to the layer farthest from the contents of the package or the layer farthest from the central axis of a tubular film and innermost refers to the layer nearest to the contents of the package or the layer nearest to the central axis of a tubular film. "Inner" refers to a layer in a multilayer structure wherein each face of the layer is in contact with another layer of the multilayer structure.

The outermost structural, or abuse, layer can comprise oriented polyethylene, oriented polyester, oriented polypropylene or oriented anhydride ionomer-toughened EVOH. This layer may be reverse printable and unaffected by the sealing temperatures used to make the package, since the package is sealed through the entire thickness of the multilayer structure. The thickness of this layer is typically selected to control the stiffness of the package, and may range from about 10 to about 60 µm, or from about 10 to about 50 µm.

The inner layer can include one or more barrier layers, depending on which atmospheric conditions (oxygen, humidity, light, and the like) that potentially can affect the product inside the pouch. The anhydride ionomer-toughened EVOH can be a barrier layer. Other barrier layer compositions can be metallized polypropylene, polyamide, polyethylene terephthalate, aluminum foil, nylon, blends or composites of the same as well as related copolymers thereof. Barrier layer thickness may depend on the sensitivity of the product and the desired shelf life.

The innermost layer of the package can be the sealant. The sealant can have minimum effect on taste, color or stability of the contents, to be unaffected by the product, and to withstand sealing conditions (such as liquid droplets, grease, dust, or the like). The sealant can be a resin that bonded to itself (sealed) at temperatures substantially below the melting temperature of the outermost layer so that the outermost layer's appearance may not be affected by the sealing process and may not stick to the jaws of the sealing bar. Sealants used in multilayer pouches include ethylene copolymers, such as low density polyethylene, linear low density polyethylene, metallocene polyethylene, or copolymers of ethylene with vinyl acetate or methyl acrylate or copolymers of ethylene and acrylic or methacrylic acid, optionally ionomerized (i.e., partially neutralized with metal ions such as Na, Zn, Mg, or Li). Sealants can also include polypropylene copolymers and be about 25 to 100 µm thick.

Examples of multilayer structures, particularly in the form of films, include (from outermost to innermost product-contact layer of the film), where "modified EVOH" represents an anhydride ionomer-modified EVOH composition as disclosed herein, "tie" represents an adhesive layer, and "sealant" represents a thermoplastic composition suitable for heat sealing. In the multilayer film structures, the symbol "/" represents a boundary between layers. The structures disclosed herein are not meant to be exhaustive list of the possible structures and are for purposes of example: Modified EVOH/tie/sealant; Polyethylene/tie/modified EVOH; Polyethylene/tie/modified EVOH/tie/polyethylene; Polypropylene/tie/modified EVOH/tie/polypropylene; Polypropylene/tie/modified EVOH/tie/polyethylene; Polyethylene/tie/modified EVOH/tie/sealant; Polyamide/tie/modified EVOH/tie/sealant; Polyamide/tie/modified EVOH/polyamide/tie/bulking layer/sealant; and Polyethylene/tie/polyamide/modified EVOH/polyamide/tie/sealant.

The modified EVOH in these structures can provide abuse resistance, temperature resistance (during heat sealing), barrier, puncture resistance, thermoformability, and/or a printable surface. Polyamide may be included as an additional barrier or structural layer. The sealant can be polyethylene, ethylene/vinyl acetate copolymer, or an ionomer or their blends. These are suitable for packaging a wide variety of food and other items such as medical devices.

Films used as packaging material may also be processed further by, for example, printing, embossing, and/or coloring to provide a packaging material to provide information to the consumer about the product therein and/or to provide a pleasing appearance of the package.

The films and sheets can be further processed into shaped articles (for example, multilayer containers such as blister packs, trays and cups) with uniaxial or biaxial stretching, axial heat sealing, thermoforming, vacuum forming, sheet folding and heat sealing (form-fill-seal), compression molding, overmolding or other molding or forming processes.

Some of the films or sheets disclosed can be further processed by thermoforming into a shaped article that could be included in packaging. In thermoforming processes, a film or sheet is heated above its softening temperature and formed into a desired shape. This formed sheet of a film or laminate is usually referred to as a forming web. Various systems and devices are used in a thermoforming process, often accompanied by vacuum-assist and plug-assist components to provide the proper forming of the forming web into a predetermined shape. Thermoforming processes and systems are well known in the art.

Films of the modified EVOH can be thermoformed at temperatures that are typically lower than the glass transition temperatures of nonmodified EVOH. This can allow for thermoforming articles having components that cannot withstand the higher temperatures. Anhydride ionomer-modified EVOH can be thermoformed at temperatures within the range of from about 100° C. to about 180° C. Often, the thermoformed articles can be shaped to conform to the shape of the product that is to be contained within the package. Thermoformed packages can be used to contain processed meats such as hot dogs, sausages and the like.

Films can be used as web stock to be formed into pouches. Pouches are formed from web stock by cutting and heat-sealing separate pieces of web stock and/or by a combination of folding and heat sealing with cutting. Pouches can be prepared by providing a continuous web of packaging film in which the film is disposed in a U- or V-shaped trough. A stand-up pouch can be prepared by providing a continuous web of packaging film in which the film comprises a gusset or pleat to provide a W-shaped trough.

The continuous web of packaging film used to prepare a flexible pouch may comprise a single sheet of film that is disposed into a trough as described above. Alternatively, the web may comprise two or three sheets of packaging film that are bonded together by, for example, heat sealing seam(s) at the bottom of the trough. In this alternative, the sheets may be the same or different. A particular form of stand-up pouch comprises three sheets of packaging film, one of which forms the bottom of the pouch and is pleated, and two that form the sides of the pouch. The sheets are joined together by two seams at the bottom of the trough. The seams provide sufficient rigidity to the pouch to enable it to stand upright.

The trough-shaped web is divided into receptacles the size of individual pouches by transverse seals prepared typically by means of heat sealing. Pouches may optionally comprise fitments to enable access to the contents of the pouch after filling. The fitment is inserted between the margins of the film web, and a top seal of the pouch is made by sealing the fitment to the margins of the web and sealing the margins to each other. The individual pouches are cut from the web by means of transverse cutters. The operations of forming, filling and sealing the pouch can be prepared by performing the steps described above concurrently and/or sequentially.

For example, the pouch may be prepared, a fitment inserted and the pouch subsequently filled. The preformed pouch is prepared generally as described above, in which flexible packaging film(s) are formed into a pouch shape and the fitment inserted between the ends of the film(s) and joined to the film(s), for example by heat sealing. Portions of the film margins are not sealed together, providing an opening for subsequent filling of the pouch. For example, the fitment is inserted and joined to the pouch at the junction of a transverse seal and the open end of the pouch, and the remainder of the open end is left unsealed. The pouch may also be shaped so that the fitment is inserted and sealed in a diagonal corner of the open end of the pouch. Pouches so prepared can be collected and transported to a separate filling operation to be filled with contents. In the filling operation, the desired amount of the contents of the pouch is placed into the pouch through the opening, by means of a metering valve. The opening is sealed by joining the margins of the film(s) that form the opening (for example, by heat sealing) to form a top seal.

Pouch making equipment such as that made by Totani Corporation, Kyoto, Japan or Klockner Barlelt Co., Sarasota, Fla., can be used.

Bottles, fuel tanks and other similar containers can be made via (co)extrusion blow molding by using standard blow molding equipment such as the ones produced by Bekum, Sig, etc. It is particularly suitable to have the bottles produced on Weiler or Rommelag blow-form-fill (BFF) machines under sterile environment. The bottles can be either single layer or multilayer structures comprising at least one layer of the anhydride ionomer modified EVOH composition.

Profile is defined by having a particular shape and by its process of manufacture is known as profile extrusion. Profile is not film or sheeting, and thus the process for making profiles does not include the use of calendering or chill rolls. Profile is not prepared by injection molding processes. Profile is fabricated by melt extrusion processes that begin by extruding a thermoplastic melt through an orifice of a die (annular die) forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. With some shapes, support means such as fiber or metal reinforcement may be used to assist in shape retention.

A common shape of a profile is tubing. Tubing assemblies for the transport of liquids and vapors are well known in the art. Tubing is used for fluid transfer in medical applications or in transferring fluids such as beverages. These applications may desire good moisture barrier properties, flavor barrier, chemical resistance, toughness and flexibility. Clarity of the tubing can be desirable for visual observation of the fluids being transferred. Furthermore, depending on the use of the tubing, there may be exposure to extremely low temperatures and/or extremely high temperatures. The compositions as described herein provide a good combination of toughness, flexibility and clarity, making them suitable for preparation of profiles such as tubing.

This invention also provides a package, for containing a product, comprising or prepared from a monolayer or multilayer film or sheet, bottle, or tubing comprising the compositions described above. Application can be both flexible (pouches) as well as rigid (bottles, tanks and thermoformed cups or trays) where high clarity, barrier and impact strength are desired. For example, packages are useful for packaging meat and other foodstuffs that are stored at low temperatures. Examples used as packaging include meat and other foodstuffs; thermoformed cups or trays for refrigerated or shelf stable foods; pouches and bottles used for containing and dispensing health care solutions, beverages or other fluids; and tubing for transferring health care solutions, beverages or other fluids. In addition to foodstuffs, beverages and healthcare solutions, the compositions may be useful in packaging, storing and/or transferring industrial chemicals, cleaning products, pesticides, fuels and other products that are not meant for consumption.

The containers and packaging materials can be of various shapes including trays, cups, caps, or lids prepared from sheets by vacuum or pressure forming; shapes prepared by deep drawing an unstretched sheet (i.e. thermoforming); shapes prepared by compression molding or other molding processes; and shapes prepared by folding a sheet and heat sealing its edges such as a gable-topped carton.

Examples of packages include pouches and/or bottles, and particularly pouches and/or bottles for storing and transferring medical solutions or nutrient solutions, comprising the compositions and multilayer structures described above. Currently, it is common practice to supply medical fluids or solutions for parenteral (for example, intravenous or IV) administration in the form of disposable, flexible pouches. One class of such pouches is commonly referred to as an "IV bag". These pouches may need a number of performance criteria, including optical clarity and transparency, collapsibility, high-temperature heat-resistance (steam sterilizable), and sufficient mechanical strength to withstand the rigors of the use environment. Medical solution pouches also desire a sufficient barrier to the passage of moisture vapor, oxygen and other gases to prevent oxidation and concentration changes of the solution contained therein.

When used to form medical solution pouches, monolayer or multilayer films prepared from anhydride modified EVOH compositions described herein possess excellent optical properties (i.e., transmission, clarity, and haze) after the medical solution-containing pouches have been heat-sterilized as described below.

In addition to providing optical properties and barrier property, the films can exhibit other performance criteria that are desired in a medical solution pouch including good flexibility and/or collapsibility and mechanical strength, and withstanding high-temperature sterilization. In addition, the films provide good barrier properties.

Optical clarity and transparency can be important to allow for a visual inspection of the solution contained within the pouch to provide a cursory determination that the medical solution to be administered is of the proper type and has not deteriorated or become contaminated.

Collapsibility is desirable in order to ensure proper and complete drainage of the pouch. As the pouch drains, atmospheric pressure collapses the pouch at a rate that is proportional to the rate of drainage. In this manner, the pouch can be fully drained and at a substantially constant rate. Consequently, the film from which the pouch is made may be sufficiently flexible such that the medical pouch is collapsible.

High-temperature heat-resistance of the film can be desirable because it allows for heat-sterilization of solution-containing medical pouches. Heat sterilization typically occurs in steam-heated autoclaves at about 116 to 130° C. for periods of 15 to 30 minutes. The manufacturer and/or packager of the medical solution normally may perform heat-sterilization before sending the packaged medical solution to the end user, e.g., a hospital. This helps to ensure that the medical solution, as packaged in the medical solution pouch, may be substantially free from contamination.

In some cases, medical fluids in pouches are stored at low temperatures and, consequently, the pouch desirably also has sufficient low-temperature toughness. Low temperature refers to a temperature of less than about 0° C., less than −5° C., or less than −15° C. Low temperature toughness can be measured by conducting testing the film for brittleness, or lack thereof, at low temperature. One test that is a measure of toughness that can be instructive is the Dart Impact test, wherein a weight is dropped onto a suspended film and the result observed and recorded. The film has an acceptable Dart Impact, of when a 50% failure rate is observed at or above 165 grams, 50% failure is observed at or above 250 grams, 50% failure is observed at or above 350 grams, or 50% failure is observed at or above 500 grams, at a temperature of −10° C. The toughness of a film can be affected by the thickness of the film, and therefore the Dart Impact results may be interpreted and compared relative to films of similar thickness.

Medical solution pouches desirably have sufficient mechanical strength to withstand the abuse that is typically encountered in the use environment. For example, in some circumstances, a plastic or rubber bladder is placed around a medical solution-containing pouch and pressurized up to about 400 mm of Hg, e.g., 300-400 mm of Hg, in order to force the solution out of the pouch an into a patient. Such a bladder is commonly referred to as a "pressure-cuff" and may be used when a patient is bleeding profusely in order to quickly replace lost fluids or when a patient has high blood pressure such that a greater opposing pressure may be generated in the pouch in order to introduce medical solution into the patient's veins. Medical solution pouches desirably have sufficient durability to remain leak-free during such procedures.

Examples of medical solutions that are packaged and administered in this manner include saline solutions, dextrose solutions, and solutions for dialysis applications. However, the films and pouches could also be used in any other application in which tough, high-clarity films or pouches are needed. For example, biological fluids such as blood and blood products, fermentation broths, biopharmaceuticals and the like may also be stored in the pouches.

Other fluids that can be packaged in pouches include beverages. The beverage can be any liquid for drinking, such as water, fruit or vegetable juices or juice drinks, soy-based products, dairy products, other flavored drinks and the like, optionally including additional ingredients such as nutrients, electrolytes, vitamins, fiber, flavoring agents, coloring agents, preservatives, antioxidants and the like suitable for human consumption.

The following Examples are merely illustrative, and are not to be construed as limiting the scope of the invention.

EXAMPLES

Materials Used

Anhydride Ionomer-1: a terpolymer comprising ethylene, 11 weight % of methacrylic acid and 6 weight % of ethyl hydrogen maleate where nominally 60% of the carboxylic acid moieties were neutralized with zinc cations.

N-ionomer-1: A zinc-neutralized ethylene methacrylic acid copolymer blended with polyamide (70:30 weight ratio) from DuPont as SURLYN® AM7927, having a melting point of 94° C., a density of 0.98 g/cc, and a MI (measured at 210° C. and 2.16 kg) of 16.

EVOH-1: An EVOH having 32 weight % ethylene, a melting point of 183° C., a density of 1.19 g/cc, and a MI of 1.6, from Eval Company of America as EVAL® F101A.

EVOH-2: An EVOH having 27 weight % ethylene, a melting point of 191° C., a density of 1.20 g/cc, and a MI of 3.9, from Eval Company of America as EVAL® L101A.

PE-1: A high density polyethylene homopolymer having a density of 0.962 g/cc and MI of 0.72, from Nova Chemicals as SCLAIR® 19A.

Tie-1: An anhydride-modified linear low density polyethylene adhesive composition having a density of 0.928 g/cc, and a MI of 3.1, from DuPont as BYNEL® 4109.

Description of Processing and Testing of Materials

Blends of EVOH-1 or EVOH-2 and Anhydride Ionomer-1 were prepared by melt mixing the base resins in a 30-mm twin-screw extruder using the components summarized in Table 1. In addition, nonmodified EVOH compositions, processed through the twin screw extruder using the same conditions as those for the blend, (C1, C2), as well as EVOH obtained straight from the bag (C5) were tested as control samples. N-ionomer-1, a prior EVOH modifier, was used in Comparative Examples C3 and C4. Monolayer EVOH films, 2 mils thick, were made on a cast film line with a 1.5-inch extruder. Melt temperature was measured at 220° C.

TABLE 1

| Example | EVOH-1 | EVOH-2 | N-ionomer-1 | Anhydride Ionomer-1 |
|---------|--------|--------|-------------|---------------------|
| C1 | 100 | 0 | 0 | 0 |
| 1 | 90 | 0 | 0 | 10 |
| 2 | 80 | 0 | 0 | 20 |
| 3 | 70 | 0 | 0 | 30 |
| C2 | 0 | 100 | 0 | 0 |
| 4 | 0 | 90 | 0 | 10 |
| 5 | 0 | 80 | 0 | 20 |
| 6 | 0 | 70 | 0 | 30 |
| C3 | 70 | 0 | 30 | 0 |
| C4 | 0 | 70 | 30 | 0 |
| C5 | 100 | 0 | 0 | 0 |

Tests carried out on the samples include Spencer impact (ASTM D3420), Transparency (ASTM D1746), Haze (ASTM D1003), Gloss (ASTM D2457) and oxygen permeation value or OPV (ASTM D3985). Table 2 summarizes measured film properties.

TABLE 2

| Example | OPV (cc mil/m$^2$ day) | Gloss (20 degree) | Haze (%) Total | Haze (%) Internal | Transparency (%) | Spencer Impact (g/mi) |
|---------|------------------------|-------------------|---------------|------------------|------------------|----------------------|
| C1 | 0.4093 | 36.53 | 2.4 | 1 | 87.8 | 133.7 |
| 1 | 0.9574 | 35.57 | 5.3 | 4 | 89.2 | 286.7 |
| 2 | 0.7771 | 23.5 | 7.2 | 4.7 | 35.8 | 617.1 |
| 3 | 0.4188 | 16.33 | 10.4 | 5.6 | 33.4 | 638.2 |
| C2 | 0.4046 | 25.27 | 8.9 | 5.6 | 59.5 | 258.7 |
| 4 | 0.3986 | 20.07 | 9.7 | 7.1 | 58.5 | 299.4 |
| 5 | 0.3216 | 17.93 | 11.5 | 8.6 | 59 | 493.4 |
| 6 | 0.5691 | 15.77 | 11.7 | 6.6 | 16.77 | 571.2 |
| C3 | 1.6297 | 17.27 | 20.8 | 17.9 | 25.8 | 638.6 |
| C4 | 1.414 | 13.87 | 24.5 | 20.8 | 32.7 | 722.4 |
| C5 | 0.5183 | 24.63 | 6.8 | 4.2 | 96.5 | 314.2 |

Examination of the results in Table 2 indicates that EVOH compositions modified with anhydride ionomer showed significant improvement in impact properties over nonmodified EVOH compositions for EVOH-1 samples (Compare Examples 1, 2, and 3 to C1 and Examples 4, 5, and 6 to C2) while maintaining similar oxygen transmission rates. A significant reduction in total haze was obtained in Examples using anhydride ionomer as the modifier instead of N-ionomer (Example 3 compared to Comparative Example C3 and Example 6 compared to Comparative Example C4) while maintaining similar Spencer impact resistance (Example 3 compared to Comparative Example C3). There was also significant improvement in oxygen barrier over the comparative modifier (Compare Examples 1, 2, and 3 to C3 and Examples 4, 5, and 6 to C4). Oxygen barrier measurements on the monolayer cast film demonstrated the superior barrier performance of modified EVOH with anhydride ionomer vs. N-ionomer (Compare Examples 3 and 6 vs. Comparative Examples C3 and C4).

Three-layer coextruded blown film samples were made on a three-layer Brampton line, having the structure: PE-1 (1 mil)/Tie-1 (1 mil)/EVOH (1 mil) where "EVOH" indicates an EVOH composition as summarized in Table 1. The films were aged by storage at ambient conditions for the time indicated in Table 3 and the peel strength was measured according to ASTM F-88 using a pull speed of 12 inches per minute. The results are summarized in Table 3. In Table 3, "STD" refers to the standard deviation and "CNS" indicates the layers could not be separated without destruction.

One adhesive composition (Tie-1) was tested. As expected due to the difference in ethylene content between EVOH-1 and EVOH-2, the adhesive bonded more effectively to EVOH-1 than to EVOH-2. Likewise, the adhesive in general provided better bond to the blends containing EVOH-1 than to the similar blends containing EVOH-2. Many of the film samples show some degree of adhesion age-up (increased adhesion strength) over a one-month period.

TABLE 3

| Example | 1 Week Aging (g/in) | | 2 Week Aging (g/in) | | 1 month Aging (g/in) | |
|---|---|---|---|---|---|---|
| | peel | STD | peel | STD | peel | STD |
| C1 | 2055 | 134 | CNS | | CNS | |
| 1 | 1322 | 423 | 1189 | 51 | 1311 | 149 |
| 2 | 751 | 80 | 831 | 55 | 933 | 159 |
| 3 | 520 | 50 | 579 | 115 | 517 | 77 |
| C2 | 2129 | 295 | 2274 | 365 | 2266 | |
| 4 | 699 | 94 | 845 | 65 | 952 | 308 |
| 5 | 736 | 79 | 797 | 122 | 879 | 49 |
| 6 | 632 | 94 | 644 | 122 | 854 | 259 |
| C3 | 735 | 74 | 793 | 94 | 820 | 76 |
| C4 | 540 | 71 | 635 | 81 | 699 | 90 |

The invention claimed is:

1. A composition comprising:
   (1) from about 60 to about 95 weight %, based on the total weight of the composition, of an ethylene vinyl alcohol copolymer; and
   (2) from about 5 to about 40 weight %, based on the total weight of the composition, of the ionomeric composition comprising
       (a) in-chain copolymerized units of ethylene;
       (b) about 5 weight % to about 15 weight % of in-chain copolymerized units of an α,β-unsaturated $C_3$-$C_8$ carboxylic acid;
       (c) about 0.5 weight % to about 18 weight % of in-chain copolymerized units of the at least one comonomer including $C_4$-$C_8$ unsaturated acid having at least two carboxylic acid groups, cyclic anhydride of $C_4$-$C_8$ unsaturated acid having at least two carboxylic acid groups, monoester of $C_4$-$C_8$ unsaturated acids having at least two carboxylic acid groups, or combinations of two or more thereof; and
       (d) 0 to about 40 weight % of in-chain copolymerized unit including alkyl acrylate or alkyl methacrylate wherein the alkyl has one to twelve carbon atoms;
   wherein the amounts of (a), (b), (c) and (d) are based on the weight of the copolymer and the combined carboxylic acid functionalities present are at least partially neutralized by one or more alkali metal, transition metal, or alkaline earth metal cations.

2. The composition of claim 1 comprising about 65 to about 95 weight % of the ethylene vinyl alcohol copolymer and about 5 to about 35 weight % of the ionomeric composition.

3. The composition of claim 1 wherein component (2)(c) is present in a range from about 4 to about 16 weight % of the copolymer.

4. The composition of claim 3 wherein component (2)(c) is present in a range from about 5 to about 10 weight % of the copolymer.

5. The composition of claim 1 wherein component (2)(c) comprises copolymerized units of a $C_1$-$C_4$ alkyl half ester of maleic acid and is present in a range from about 6 to about 10 weight % of the copolymer.

6. The composition of claim 5 wherein component (2)(c) is present in a range from about 6 to about 8 weight % of the copolymer.

7. The composition of claim 1 wherein component (2) is a copolymer of ethylene, methacrylic acid and $C_1$-$C_4$ alkyl monoester of maleic acid, wherein said copolymer is from about 40 to about 60% neutralized.

8. The composition of claim 7 wherein the $C_1$-$C_4$ alkyl monoester of maleic acid is present in the copolymer in a range from about 6 to about 10 weight %.

9. The composition of claim 1 further comprising (3) one or more E/X/Y copolymers where E represents copolymerized units of ethylene, X represents copolymerized units of a $C_3$-$C_8$ α,β-ethylenically unsaturated monocarboxylic acid, and Y represents copolymerized units of a comonomer selected from alkyl acrylate or alkyl methacrylate wherein the alkyl groups have from 1 to 8 carbon atoms, wherein X is present in from about 2 to about 30 weight % of the E/X/Y copolymer, and Y is present from 0 to about 40 weight % of the E/X/Y copolymer, at least partially neutralized by one or more alkali metal, transition metal, or alkaline earth metal cations.

10. The composition of claim 1 further comprising a nonionomeric thermoplastic material including one or more polyamides, copolyetheresters, copolyetheramides, elastomeric polyolefins, styrene diene block copolymers, thermoplastic polyurethanes, or maleic anhydride-grafted polymers.

11. The composition of claim 10 wherein the nonionomeric thermoplastic material is the maleic anhydride-grafted polymer including maleated polyethylene, maleated polypropylene, maleated polyethylene/polypropylene rubber, maleated styrene-ethylene-butene-styrene triblock copolymer, maleated polybutadiene, maleated ethylene/vinyl acetate, maleated ethylene/alkyl acrylate, or combinations of two or more thereof.

12. An article comprising or produced from a composition wherein the composition is as recited in claim 1.

13. The article of claim 12 wherein the article is a monolayer or multilayer film or sheet, pouch or bag, bottle, tray, tank, or tubing.

14. The article of claim 13 wherein the article is a monolayer or multilayer film wherein the film is oriented in at least one direction and optionally annealed.

15. The article of claim 13 wherein the article is a thermoformed monolayer or multilayer film or sheet.

16. A package comprising or produced from a composition or an article as recited in claim 14 or 15.

17. The package of claim 16 wherein the package is for containing meat.

18. The package of claim 16 wherein the package is a pouch.

19. The package of claim 18 wherein the package is a pouch for storing and administering a medical solution.

* * * * *